(12) United States Patent
Lee et al.

(10) Patent No.: US 11,341,754 B2
(45) Date of Patent: May 24, 2022

(54) METHOD AND APPARATUS FOR AUTO CALIBRATION

(71) Applicant: SAMSUNG ELECTRONICS CO., LTD., Suwon-si (KR)

(72) Inventors: Won-ju Lee, Suwon-si (KR); Ja-hoo Koo, Seoul (KR); Se-ho Shin, Suwon-si (KR); Dong-wook Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 16/660,315

(22) Filed: Oct. 22, 2019

(65) Prior Publication Data
US 2020/0125862 A1 Apr. 23, 2020

(30) Foreign Application Priority Data
Oct. 23, 2018 (KR) .................. 10-2018-0126540

(51) Int. Cl.
| | | |
|---|---|---|
| *G06V 20/56* | (2022.01) | |
| *G06K 9/62* | (2022.01) | |
| *G06T 7/80* | (2017.01) | |
| *G06T 5/00* | (2006.01) | |
| *G06T 7/00* | (2017.01) | |
| *G05D 1/02* | (2020.01) | |
| *B62D 1/02* | (2006.01) | |
| *B62D 15/02* | (2006.01) | |
| *B60W 50/00* | (2006.01) | |

(52) U.S. Cl.
CPC ......... *G06V 20/588* (2022.01); *B62D 15/025* (2013.01); *G05D 1/0231* (2013.01); *G06K 9/6218* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,920,959 B1 | 4/2011 | Williams | |
| 10,115,024 B2* | 10/2018 | Stein | G06K 9/00791 |
| 2018/0045536 A1 | 2/2018 | Kümmerle et al. | |
| 2018/0067198 A1 | 3/2018 | Valois et al. | |
| 2018/0181142 A1 | 6/2018 | Baran | |
| 2018/0350085 A1* | 12/2018 | Lu | G06T 11/60 |

FOREIGN PATENT DOCUMENTS

| | | | | |
|---|---|---|---|---|
| CN | 106408938 A | * | 2/2017 | ............... G06T 7/80 |
| CN | 108303994 A | * | 7/2018 | |
| CN | 109427199 A | * | 3/2019 | |
| CN | 110570475 A | * | 12/2019 | ............... G06T 7/73 |
| KR | 10-2014-0071174 A | | 6/2014 | |
| KR | 10-1673716 B1 | | 11/2016 | |
| KR | 10-2018-0089812 A | | 8/2018 | |
| WO | WO-2018204656 A1 | * | 11/2018 | ......... G06K 9/00798 |

* cited by examiner

*Primary Examiner* — Mohammed Rachedine
(74) *Attorney, Agent, or Firm* — Sughrue Mion, PLLC

(57) ABSTRACT

Provided are a calibration method and a calibration apparatus for steering assist or autonomous driving of a vehicle in which lines on a road are detected from an image and coordinates of the lines in an image domain are transformed into coordinates in a world domain to update homography matrix that represents a transformation relationship between the image domain and the world domain, and controlling the vehicle traveling on the road based on the lines.

20 Claims, 11 Drawing Sheets

<DRIVING LANES>    <CROSSWALK>    <ROAD MARKINGS>

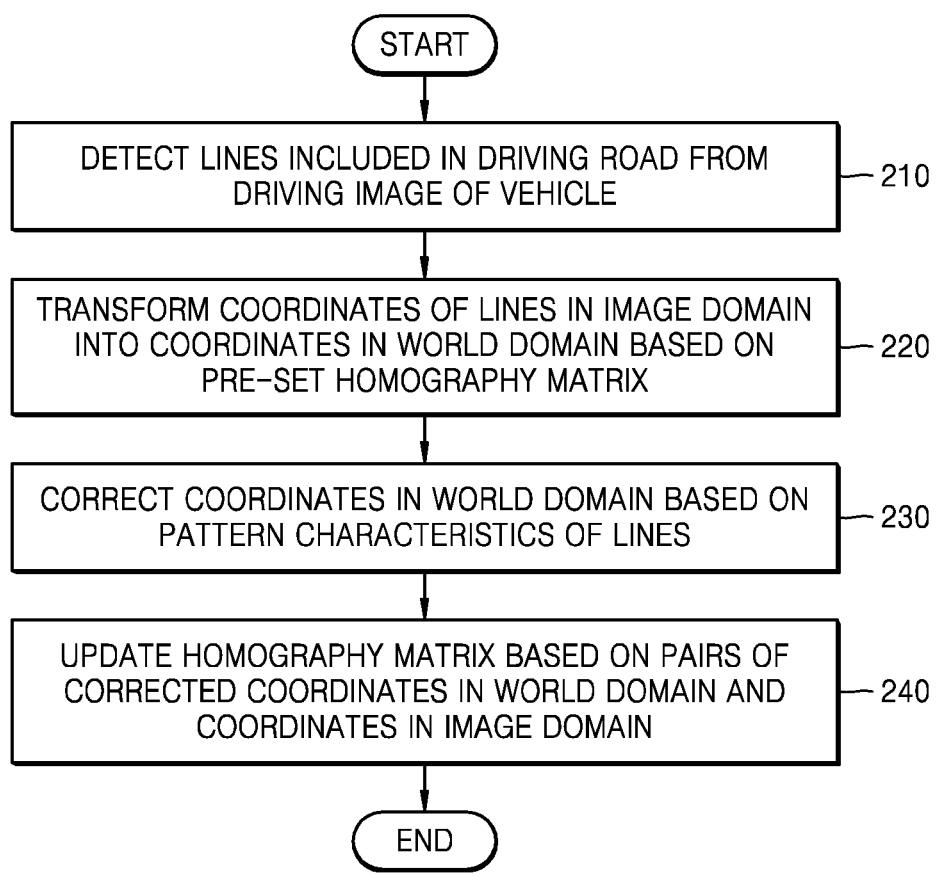

METHOD AND APPARATUS FOR AUTO CALIBRATION

CROSS-REFERENCE TO RELATED APPLICATION

This application claims priority from Korean Patent Application No. 10-2018-0126540, filed on Oct. 23, 2018, in the Korean Intellectual Property Office, the disclosure of which is herein incorporated by reference in its entirety.

BACKGROUND

Embodiments of the disclosure relate to a calibration method and a calibration apparatus.

An autonomous driving vehicle recognizes objects like lanes and nearby vehicles through a camera sensor, thereby maintaining a travelling lane, maintaining distances to other vehicles, and generating a path through estimation of a position and trajectory of a vehicle. At this time, the autonomous driving vehicle may perform a technique for reconstructing coordinates in an image domain as coordinates in a world domain through a homography matrix assuming that all objects detected in the image domain are at an altitude that is the same altitude as itself.

However, in an actual road environment, not all objects are at the same altitude, much less the same altitude as the autonomous driving vehicle due to road curvatures, sloped surfaces, and vehicle height. Therefore, in the case of transforming domains of coordinates by using a fixed homography operation, a result thereof may be inaccurate, and thus errors may occur in line detection, object detection, and position and trajectory estimation. Such errors may lead to instability of driving, and in particular, significantly deteriorate the accuracy of detection and/or estimation in an environment of changing altitude, such as a ramp with different altitudes or changing roads.

SUMMARY

According to an aspect of the disclosure, there is provided a calibration method for steering assist or autonomous driving of a vehicle including detecting lines in an image of a road captured by the vehicle traveling on the road; transforming coordinates of the lines in the image of the road from an image domain into coordinates of the lines in a world domain in which the vehicle travels based on a homography matrix that represents a transformation relationship between the image domain and the world domain; correcting the coordinates of the lines in the world domain based on characteristics of at least one of the lines; updating the transformation relationship of the homography matrix based on the corrected coordinates of the lines in the world domain and the coordinates of the lines in the image domain; and providing an output result of the updating for controlling the vehicle traveling on the road based on the lines.

According to an aspect of the disclosure, there is provided a calibration apparatus for steering assist or autonomous driving of a vehicle including a sensor configured to obtain an image of a road being traveled by the vehicle; and a processor configured to detect lines in the image of the road, transform coordinates of the lines in the image of the road from an image domain into coordinates of the lines in a world domain in which the vehicle travels based on a homography matrix that represents a transformation relationship between the image domain and the world domain, correct the coordinates of the lines in the world domain based on characteristics of at least one of the lines, update the homography matrix based on the corrected coordinates of the lines in the world domain and the coordinates of the lines in the image domain, and provide an output result of the updating for controlling the vehicle traveling on the road based on the lines.

According to an aspect of the disclosure, there is provided a calibration apparatus for steering assist or autonomous driving of a vehicle including a sensor configured to detect an image of a road being traveled by the vehicle; and a processor configured to detect a pattern of lines in the image of the road, transform coordinates of the pattern of the lines from an image domain into coordinates of the pattern of the lines in a world domain based on a homography matrix that represents a transformation relationship between the image domain and the world domain, correct the coordinates of the pattern of the lines in the world domain based on characteristics of the pattern of the lines, update the transformation relationship of the homography matrix based on the corrected coordinates of the pattern of the lines in the world domain and the coordinates of the pattern of the lines in the image domain, and provide an output result of the updating for controlling the vehicle traveling on the road based on the pattern of the lines.

BRIEF DESCRIPTION OF THE DRAWINGS

Embodiments of the disclosure will be more clearly understood from the following detailed description taken in conjunction with the accompanying drawings in which:

FIG. 2 is a flowchart of a calibration method according to an embodiment;

DETAILED DESCRIPTION OF THE EMBODIMENTS

Figure 1A:
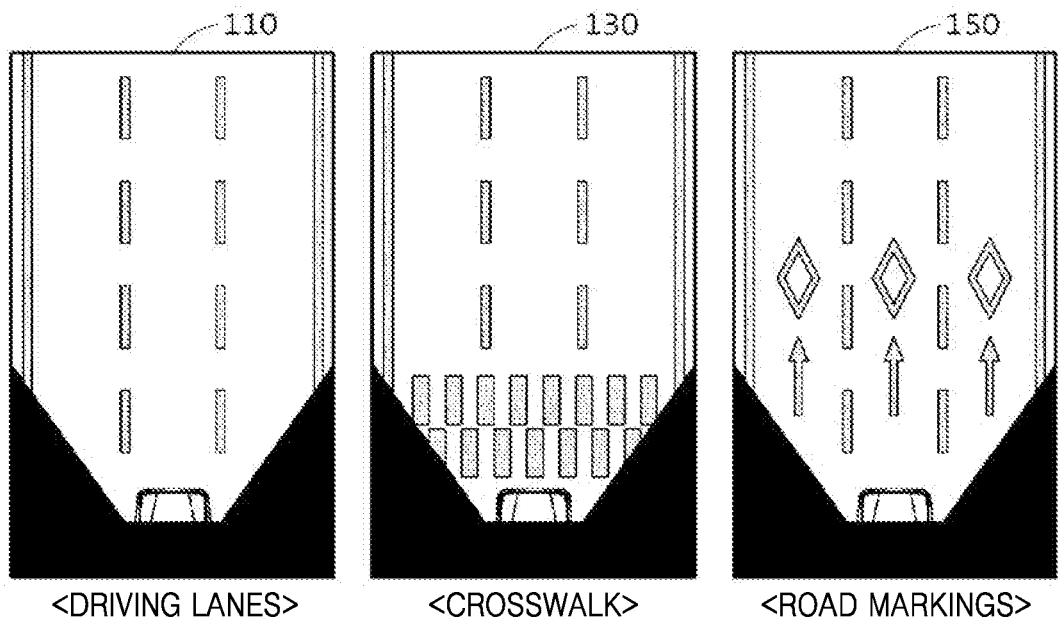
FIGS. 1A and 1B are diagrams for describing a calibration method according to an embodiment.

Embodiments to be described below may be used to display lines in an augmented reality navigation system, like a smart vehicle, or to generate visual information to assist steering of an autonomous driving vehicle. In addition, embodiments may assist safe and comfortable driving by interpreting visual information in a device including an intelligent system like a head up display (HUD) installed in a vehicle for driving assistance or fully autonomous driving. Embodiments may be applied to, for example, autonomous driving vehicles, intelligent vehicles, smart phones, and mobile devices.

Hereinafter, embodiments will be described in detail with reference to the accompanying drawings. Like reference numerals in the drawings denote like elements.

Expressions such as "at least one of," when preceding a list of elements, modify the entire list of elements and do not modify the individual elements of the list. For example, expressions in or similar to the forms of "at least one of a, b, and c," "at least one of a, b, or c," and "at least one of a, b, and/or c" should be understood as including all the combinations of only a, only b, only c, both a and b, both a and c, both b and c, and all of a, b, and c.

Hereinafter, a 'road' may include a freeway, a national highway, a local road, a high-speed national highway, etc. on which user's vehicles are travelling. A road may include one or more lanes. A 'driving lane' may correspond to any one lane occupied by a driving vehicle (lane on which the driving vehicle is travelling) from among a plurality of lanes. 'Lanes' may be distinguished from each other by lane markings indicated on a road surface. One lane may be identified by lane markings on the left and right of the lane. 'Road markings' are markings on the surface of a road on which a vehicle is travelling and may include not only lane markings like a center line and a guide line or edge line, but also non-lane markings including signs like a lane changeable line, a left-turn prohibition line, reflectors, physical barriers and walls, electrical signals emitted by emitters for detection by sensors, and a driving direction guide line and letters like a child protection zone and a speed-down zone.

Figure 1B:
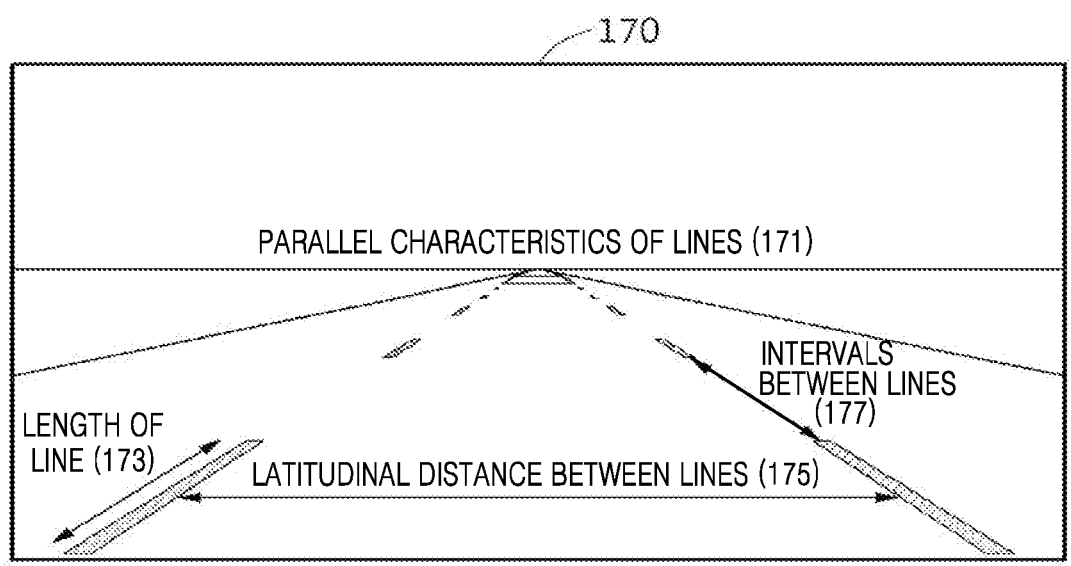

FIGS. 1A and 1B are diagrams for describing a calibration method according to an embodiment. Referring to FIG. 1A, there are shown a diagram 110 showing lanes, a diagram 130 showing a crosswalk, and a diagram 150 showing other road markings.

Each of the drawings 110, 130, and 150 may include a certain pattern that may be used to determine whether the position or posture of a camera is altered or to identify a certain pattern that may be used as a landmark, e.g., lanes, a crosswalk, and other road markings provided on a road surface.

A calibration apparatus according to an embodiment may perform calibration by updating a homography matrix by using pattern characteristics included in an image even without map information, a reference point, or other lane specification information when the position or posture of a camera is altered. The pattern characteristics may include various characteristics with certain regularity and/or repetition, e.g., the size of a pattern, the symmetry of the pattern, the shape of the pattern, the parallelism between shapes constituting the pattern, the lengths of the shapes, intervals between the shapes, and the widths of the shapes. For example, when a single image includes all patterns like lanes, a crosswalk, and road markings, the calibration apparatus may use any one of the patterns or all of the patterns together to improve the accuracy of a calibration. Hereinafter, the pattern characteristics of a line(s), which is an example of patterns, will be described with reference to FIG. 1B.

Referring to FIG. 1B, a drawing 170 shows pattern characteristics of lines detected in a driving image. The pattern characteristics of lines according to an embodiment may include, for example, parallel characteristics 171 of lines, length(s) 173 of the line(s), width(s) 175 of a lane (e.g. a latitudinal distance between lines), and an interval 177 between line segments.

The parallel characteristics 171 between lines indicates that lines on the same road or lines ('lane dividers') constituting (defining) one lane are parallel to each other. For example, when lines are intermittent dashed lines, the length 173 of the line(s) may correspond to the length of one partial line included in one lane on the road. The width 175 of the lanes may correspond to the latitudinal width (or distance) between a first line and a second line on the same road. The interval 177 between dashed lines may correspond, for example, to an interval between the partial dashed lines included in a line, i.e., an interval between a first partial line and a second partial line included in a second lane. The length 173 of the line(s), the width 175 of the lane, and the interval 177 between the lines may be determined according to lane specifications in a jurisdiction. The lane specifications in the jurisdiction may vary according to road types (or road grades) according to a country or other jurisdiction.

FIG. 2 is a flowchart of a calibration method according to an embodiment.

Referring to FIG. 2, a calibration apparatus according to an embodiment detects lines included in a driving road from a driving image of a vehicle (operation 210). The vehicle may perform collision avoidance by detecting nearby vehicles, driving lanes, and road markings including lines, etc. from a captured driving image and perform pathfinding and direction control by identifying and/or detecting signs and traffic lights. Hereinafter, the 'vehicle' may be understood as an automobile having an autonomous driving function and/or an advanced driver assistance (ADA) function.

A driving image may be obtained as a 2D image, at the time of driving a vehicle, using an image capturing device that is mounted on the vehicle and is configured to capture images of front view, rear view, and/or side views of the vehicle. Alternatively, the driving image may be an external image of at least one of the front view, rear view, and/or side views of a vehicle received from outside of the calibration apparatus via a communication interface (e.g., communication interface 1170 of FIG. 11). The driving image may include, for example, a road image, and/or a road surface image like a 2D driving image 310 shown in FIG. 3. The driving image may include various images like an infrared image in addition to a color image. The driving image may include a single frame or may include a plurality of consecutive frames.

In operation 210, the calibration apparatus may detect lines from the driving image. The lines may be detected by identifying pixels of lines from the driving image by using, for example, a pixel-wise scene segmentation technique or an edge detection technique. Alternatively, the calibration apparatus may detect lines from the driving image by using a neural network that is trained to recognize lines. For example, the neural network may be trained with bounding boxes of lane markings to detect and types of lane markings to detect.

The calibration apparatus transforms the coordinates of the lines in the image domain into coordinates in the world domain based on a preset homography matrix (operation 220). That is, the coordinates of the lines in the image may be transformed into physical dimensions in the real-world environment surrounding the vehicle. The homography matrix may indicate a constant transformation relationship that is established between projected corresponding points when one plane is projected onto another plane. The homography matrix may, for example, represent a transformation relationship (correspondence) in the case of transforming the coordinates in a 2D image domain into the coordinates of a corresponding 3D world domain. The preset homography matrix may be, for example, an initial homography matrix determined based on intrinsic and extrinsic parameters used during the calibration of an image capturing device (camera). A method by which the calibration apparatus transforms the coordinates of the lines in the image domain into the coordinates in the world domain will be described below in detail with reference to FIG. 3.

The calibration apparatus corrects the coordinates in the world domain transformed in operation 220 based on the pattern characteristics of the lines (operation 230). The pattern characteristics of lines may include, for example, parallel characteristics of lines, length(s) of the line(s), width(s) of a lane, and an interval between lines.

In operation 230, the calibration apparatus may select at least one reference line from among lines based on, for example, the position of a vehicle. The calibration apparatus may measure the reference line characteristics of the reference line. The calibration apparatus may correct the world domain coordinates of at least one of lines other than the reference line based on the reference line characteristics. The reference line may correspond to, for example, a line closest to the position of the vehicle or a line close to the center of a driving image. Generally, computations through a homography matrix may be more reliable as the distance to the line is close and toward the center of the image.

Accordingly, according to an embodiment, a line close to the center of the driving image or a line closest to the position of the vehicle (e.g., any one of lane dividers of a driving lane) may be selected as a reference line, and reference line characteristics of the reference line may be measured, thereby improving accuracy of correction. In this case, the reference line characteristic may include, for example, a characteristic that the reference line and the remaining lines are parallel to each other, the length of the reference line, a distance between the reference line and the remaining lines adjacent to each other in the latitudinal direction, an interval between partial lines in the reference line, etc. The reference line characteristic may be referred to as a pattern of the reference line or a pattern characteristic. The reference line characteristic may be with respect to only the reference line or with respect to one or more lines, such as the distance between lines across a width of the road.

According to embodiments, the calibration apparatus may use the reference line for calibration after determining the accuracy of the selected reference line. The calibration apparatus may, for example, select the line closest to the position of the vehicle as the reference line. The calibration apparatus determines the length of the reference line, a distance between the reference line and a line close to the reference line in the longitudinal direction, and a distance between any one of partial lines of the reference line and a partial line adjacent to the any one partial line in the latitudinal direction. At this time, when there is information including the lengths of lines, distances between lines in the longitudinal direction, and distances between the lines in the latitudinal direction on a high-precision map, the calibration apparatus may perform correction without measuring.

For example, on a current road surface, when respective differences between the length of each line, a distance between the lines in the longitudinal direction, and a distance between the lines in the latitudinal direction and Cambria Math, are less than a pre-set threshold value, the calibration apparatus may correct x coordinates and y coordinates in the world domain.

The calibration apparatus may, for example, correct the x-coordinates (of the lines) in the world domain based on at least one of the parallel characteristics between the lines and the distance between the lanes in the latitudinal direction. A method by which the calibration apparatus corrects the x-coordinates of the lines in the world domain will be described below in detail with reference to FIG. 4. The calibration apparatus may also correct the y-coordinates of the lines in the world domain, for example, based on at least one of the length of lines and the interval between lines. A method by which the calibration apparatus corrects the y-coordinates of the lines in the world domain will be described below in detail with reference to FIG. 5.

The calibration apparatus may update the reference line characteristics based on at least one of the line characteristics of a driving road according to a high-resolution map and the lane characteristics of the driving road according to a jurisdiction.

The calibration apparatus updates the homography matrix based on pairs of the coordinates in the 3D world domain corrected in operation 230 and the coordinates in the image domain (operation 240).

The calibration apparatus may output a result of the calibration either explicitly or implicitly. The output of the calibration result may explicitly include, for example, displaying the position of a line corrected by the calibration or the world domain coordinates of the corrected line on a screen (or a map) and/or outputting the world domain coordinates of the corrected line by audio. On the other hand, the output of the calibration results may implicitly include, for example, controlling a vehicle based on the corrected position of lines, determining the position of the vehicle, and setting or changing a driving route.

Figure 3:
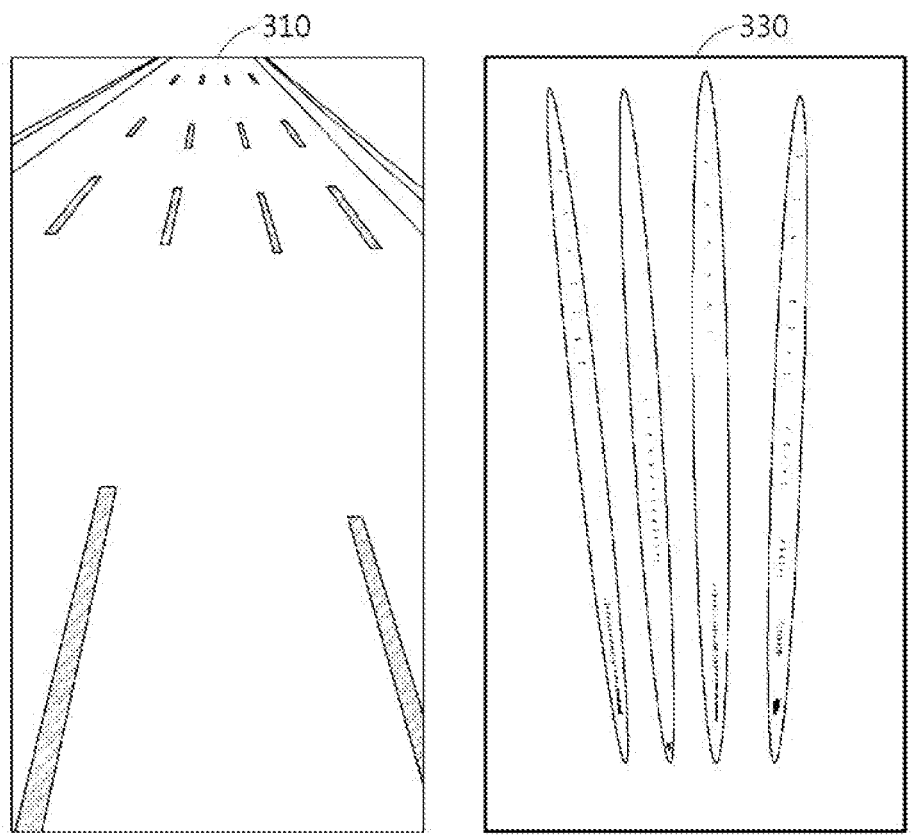
FIG. 3 is a diagram for describing a method of transforming image domain coordinates of lanes detected from a driving image into world domain coordinates according to an embodiment.

FIG. 3 is a diagram for describing a method of transforming image domain coordinates of lanes detected from a driving image into world domain coordinates according to an embodiment.

FIG. 3 shows a driving image 310 and a diagram 330 showing a result of transforming the coordinates of lanes detected from the driving image 310 in the image domain to the coordinates in the world domain by using a pre-set homography matrix.

The calibration apparatus according to an embodiment may divide a portion corresponding to an object (for example, a line) included in the driving image 310 into semantic units by using, for example, a semantic segmentation technique and detecting the object at the pixel level, thereby generating a segmentation image. By using the semantic segmentation technique, an object may be densely predicted pixel-by-pixel, objects included in the driving image 310 may be determined, and unit areas including an object class may be output pixel-by-pixel. The calibration apparatus may generate a segmentation image through a classification network including, for example, a plurality of convolution layers and a fully-connected layer. The calibration apparatus may divide an object into semantic units from the driving image 310 by using a well-known classification network like AlexNet, VGGNet, and GoogleNET, determine the meaning of a divided area pixel-by-pixel, and label each class, thereby detecting pixels of lines from a segmentation image.

The calibration apparatus may transform the coordinates of pixels corresponding to lines in the segmentation image in the 2D image domain into the coordinates in the 3D world domain by using a preset homography matrix (or an initial homography matrix). Pixels corresponding to the lines of which the coordinates are transformed into the coordinates in the 3D world domain may be detected as shown in the drawing 330.

The coordinates of the pixels corresponding to the lines in the 3D world domain transformed by using the initial homography matrix may be different from the actual coordinates of the lines due to, for example, alteration of the posture and/or position of a camera for capturing a driving image, a scale difference caused by a difference between the altitudes of a road surface, and/or an imbalance caused by a road surface bank. According to an embodiment, such differences may be corrected more quickly and accurately by using the pattern characteristics of the lines.

Figure 4:
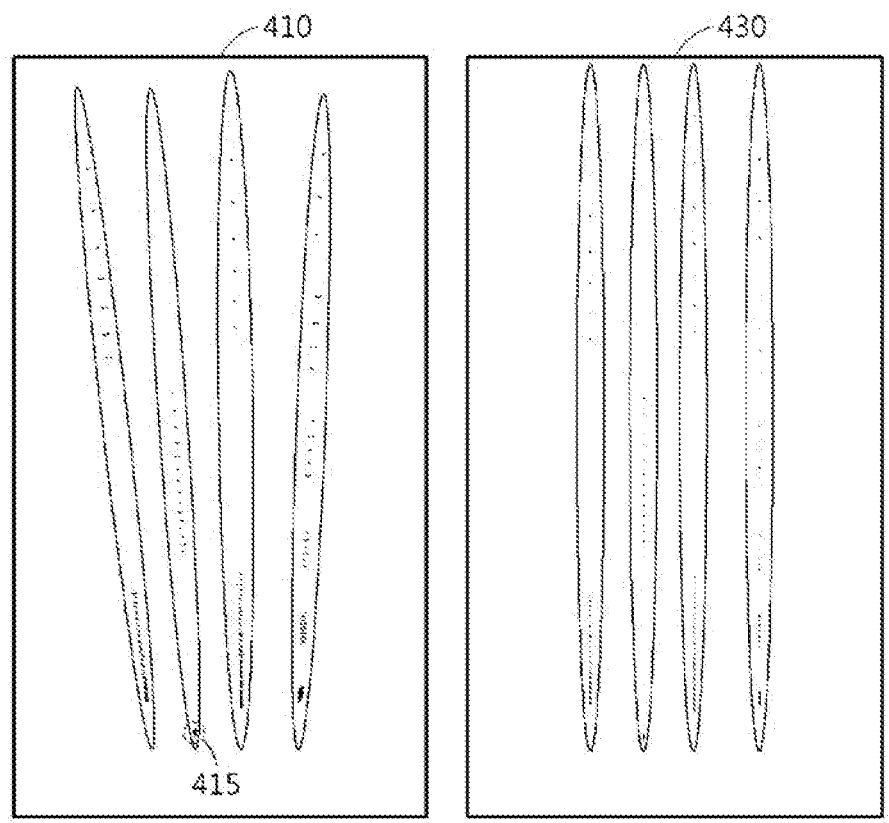
FIGS. 4 and 5 are diagrams for describing a method of correcting world domain coordinates of lanes based on pattern characteristics of lanes according to embodiments.

FIG. 4 is a diagram for describing a method of correcting world domain coordinates of lines based on pattern characteristics of the lines according to an embodiment.

FIG. 4 shows a diagram 410 showing a result of transforming the coordinates of lines into the coordinates in the world domain and a diagram 430 showing a result of correcting the x-coordinates of the lines in the world domain.

The calibration apparatus according to an embodiment may select a reference line (e.g., a second line from the left) from among any of the lines shown in the diagram 410, based on the position of a vehicle. The calibration apparatus may, for example, select a pixel 415 of the second line that is closest to the vehicle, from among pixels of the lines shown in the drawing 410. Because the pixel closest to the vehicle is a different in altitude from the vehicle, the calibration apparatus may select such a pixel and correct the x-coordinates of the other lines, thereby improving the accuracy of a correction.

The calibration apparatus may measure the x-coordinate (latitudinal position) of the pixel 415 of the second line. The calibration apparatus may cluster the coordinates of the lines on the left and right of the second line in the world domain line-by-line based on the position of the pixel 415 of the second line. At this time, the calibration apparatus may, for example, cluster pixels included in each line through a connected component operation. A connection component operation is an operation used in graph theory and is used to connect a dependent graph including vertices connected via at least one path in the dependent graph. The calibration apparatus may cluster the pixels corresponding to a same line into a same group through a connection component operation.

The calibration apparatus may correct the x coordinates of lines in the world domain (latitudinal positions), such that the clustered lines are parallel to each other around the x-coordinate of the pixel 415 of the second line and distances between the clustered lines are identical. As the calibration apparatus corrects the x-coordinates of the lines in the world domains, the lines may be arranged in parallel at regular intervals as shown in the drawing 430.

Figure 5:
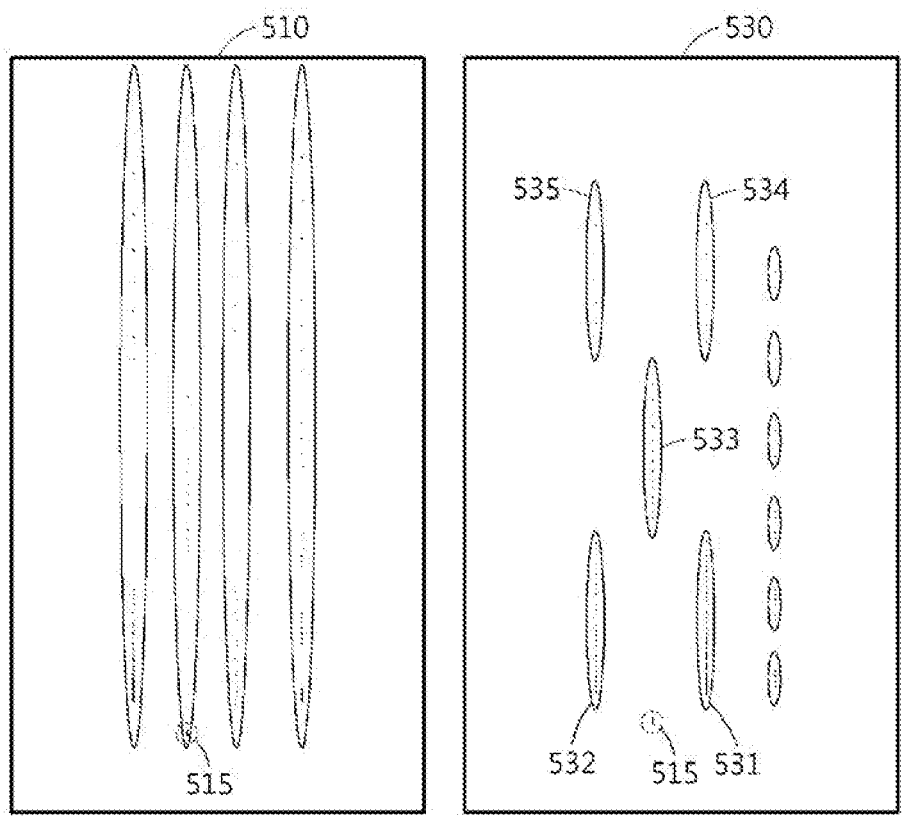

FIG. 5 is a diagram for describing a method of correcting world domain coordinates of lines based on pattern characteristics of the lines according to an embodiment.

FIG. 5 shows a diagram 510 showing a result of correcting the x-coordinates of lines in the world domain and a diagram 530 showing a result of correcting the y-coordinates of the lines in the world domain.

The calibration apparatus according to an embodiment may correct the y coordinates (longitudinal positions) of the lines in the world domain after correcting the x-coordinates (latitudinal positions) of the lines in the world domain.

As in the case of correcting the x-coordinates of the lines in the world domain, the calibration apparatus may select, for example, a pixel 515 of a second line closest to a vehicle from among pixels of the lines shown in the drawing 510. The calibration apparatus may cluster lines whose x coordinates (latitudinal positions) are corrected in the drawing 510 according to partial lines 531, 532, 533, 534, and 535 as shown in the drawing 530.

The calibration apparatus may set the closest partial line 531 from among fully-visible partial lines 531, 532, 533, 534, and 535 around the pixel 515 of the second line as a reference partial line for determining the lengths of the partial lines 532, 533, 534, and 535. The calibration apparatus may correct the y-coordinates of the remaining partial lines 532, 533, 534, and 535 such that the length of each of the remaining partial lines 532, 533, 534, and 535 is equal to the length of the reference partial line 531. In addition, the calibration apparatus may set a partial line 533 included in the same line as the pixel 515 of the second line as a partial reference line for determining the interval between partial lines. The calibration apparatus may correct the y-coordinates of the remaining partial lines 531, 532, 534, and 535 such that the interval between the pixel 515 of the second line and the reference partial line 533 is equal to the interval between the remaining partial lines 531, 532, 534, and 535.

Figure 6:
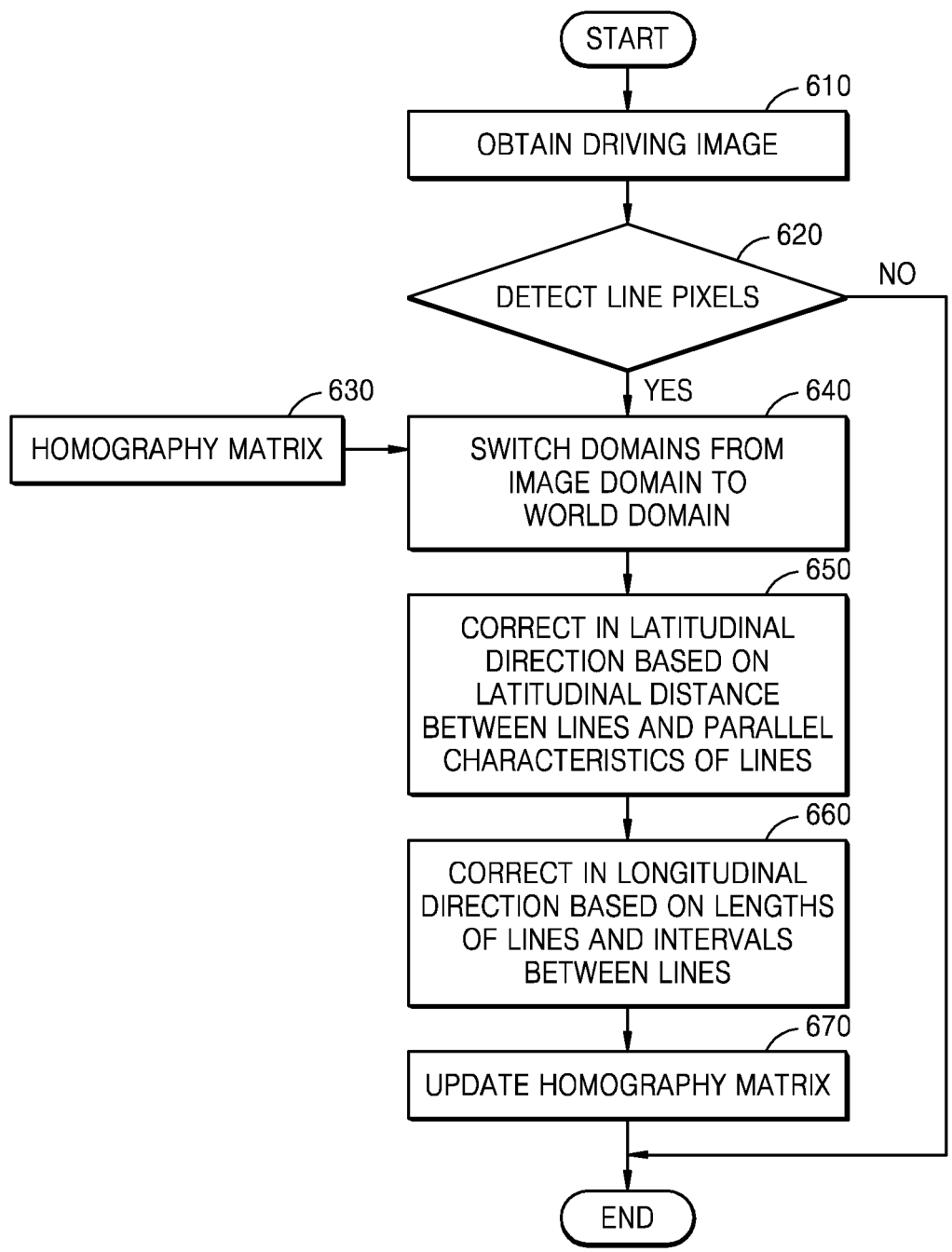
FIGS. 6, 7, and 8 are flowcharts of a calibration method according to embodiments.

FIG. 6 is a flowchart of a calibration method according to another embodiment.

Referring to FIG. 6, a calibration apparatus according to an embodiment may determine whether a line pixel(s) has been detected from a driving image (operation 620) when a driving image of a vehicle is acquired (operation 610). When it is determined in operation 620 that no line pixel is detected, the calibration apparatus may terminate the operation.

Otherwise, when it is determined in operation 620 that the line pixel(s) is detected, the calibration apparatus may transform the coordinates of the detected line pixel(s) from the coordinates in the image domain to the coordinates in the world domain by using a homography matrix, which is pre-set in operation 630, (operation 640).

The calibration apparatus may correct the coordinates of the line pixel(s) transformed to the coordinates to the world domain in operation 640 in the latitudinal direction based on the latitudinal distance between lines and/or line parallel characteristics (operation 650).

The calibration apparatus may correct the coordinates of the line pixels, which are corrected in the latitudinal direction in operation 650, in the longitudinal direction based on the length of lines and/or the interval between lines (operation 660).

The calibration apparatus may update the homography matrix, which is pre-set in operation 630, based on the coordinates in the world domain and the coordinates in the image domain corrected in operation 660 (operation 670). The calibration apparatus may perform calibration based on an updated homography matrix.

Figure 7:
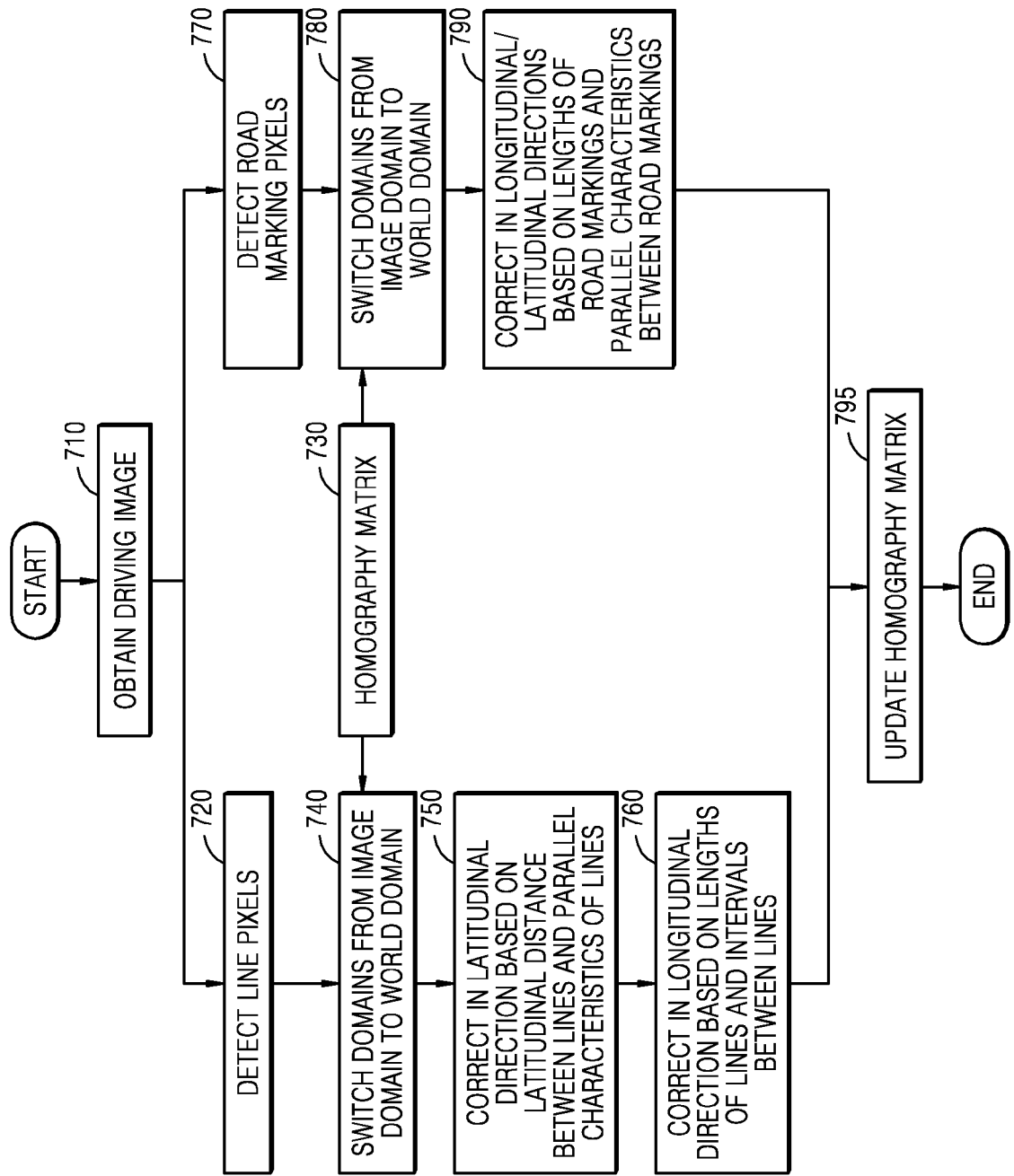

FIG. 7 is a flowchart of a calibration method according to another embodiment.

FIG. 7 shows an embodiment in which the calibration apparatus according to an embodiment updates a homography matrix by taking into account not only the pattern characteristics of lines described above with reference to FIG. 6, but also the pattern characteristics of road markings other than the lines included in a driving road.

The calibration apparatus may detect line pixel(s) from a driving image (operation 720) when the driving image of a vehicle is obtained (operation 710). The calibration apparatus may transform the coordinates of the detected line pixel(s) from the coordinates in the image domain to the coordinates in the world domain by using a homography matrix, which is pre-set in operation 730, (operation 740).

The calibration apparatus may correct the coordinates of the line pixel(s) transformed to the coordinates to the world domain in operation 740 in the latitudinal direction based on the latitudinal distance between lines and/or line parallel characteristics (operation 750).

The calibration apparatus may correct the coordinates of the line pixels, which are corrected in the latitudinal direction in operation 750, in the longitudinal direction based on the length of lines and/or the interval between lines (operation 760).

At the same time, when the driving image of the vehicle is obtained (operation 710), the calibration apparatus may detect pixels corresponding to a road marking other than the lines included in a driving road (e.g., a crosswalk marking) (operation 770). The calibration apparatus may transform the coordinates of the road marking in the image domain to the coordinates of the road marking in the world domain based on the homography matrix, which is pre-set in operation 730, (operation 780).

The calibration apparatus may correct the coordinates of the road marking in the world domain in the longitudinal direction and the latitudinal direction based on the pattern characteristics of the road marking (e.g., the length of the road marking and/or parallel characteristics, etc.) (operation 790). The pattern characteristics of the road marking may include, for example, the width of the road marking, the length of the road marking, the size of the road marking, the symmetry of the road marking, the parallel characteristics, and the shape of the road marking. For example, in operation 790, the calibration apparatus may correct the x-coordinates of the road marking in the world domain based on the length of the road marking and correct the y-coordinates of the road marking in the world domain based on the width of the road marking.

The calibration apparatus may update the homography matrix based on the coordinates of the line pixels corrected through operations 720 to 760 and/or the coordinates of the road marking in the world domain corrected through operations 770 to 790 (operation 795).

According to an embodiment, the accuracy of calibration may be improved by updating the homography matrix by considering the pattern characteristics of road markings other than lines included in a driving road in addition to the pattern characteristics of the lines.

Figure 8:
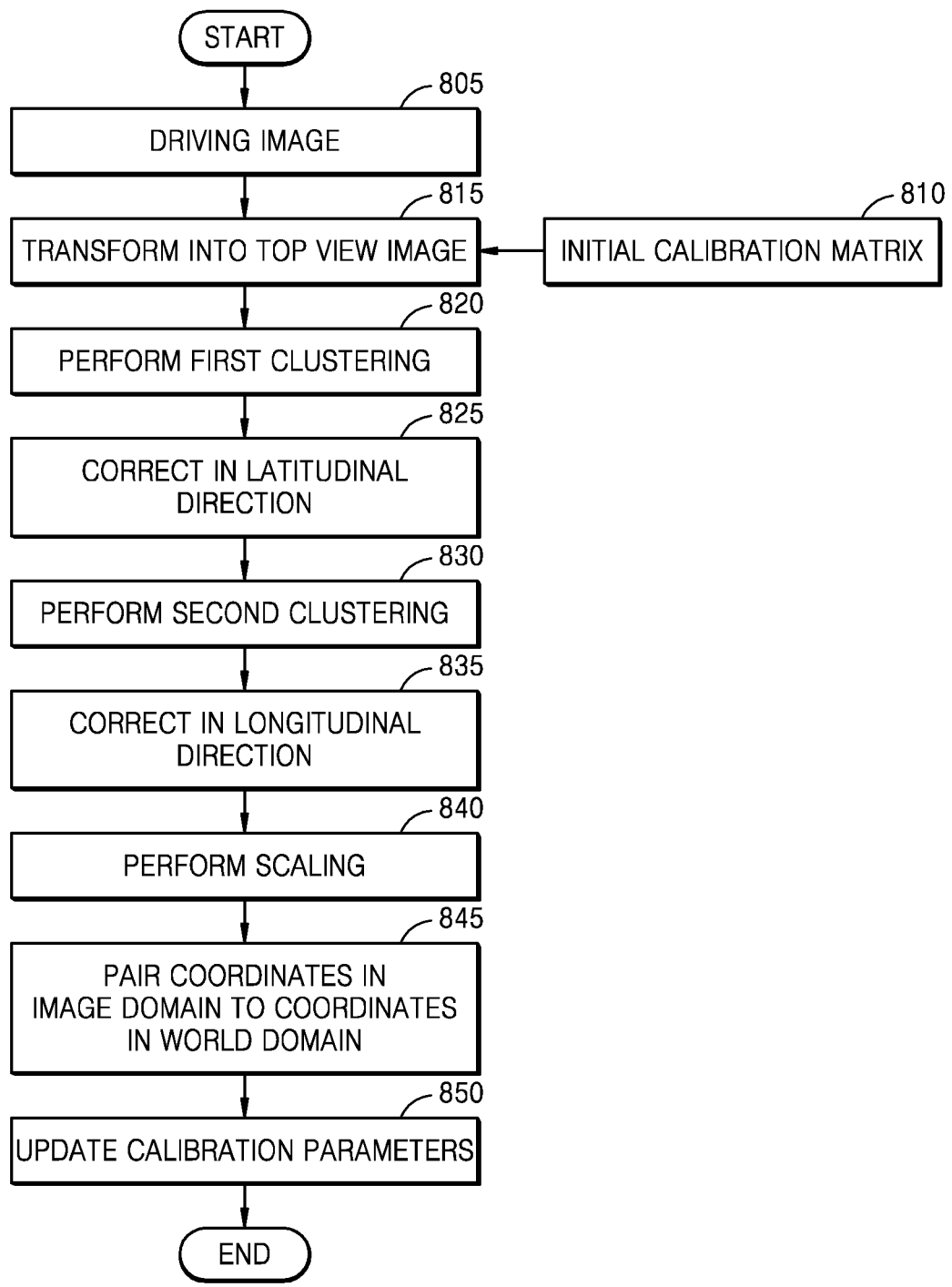

FIG. 8 is a flowchart of a calibration method according to an embodiment.

Referring to FIG. 8, when a 2D driving image of a vehicle is obtained (operation 805), a calibration apparatus according to an embodiment may transform the 2D driving image into a 3D top view image by using an initial calibration matrix, which is pre-set in operation 810 (operation 815). At this time, the calibration apparatus may transform the coordinates of line pixel(s) detected from the 2D driving image into the coordinates in the 3D world domain.

The calibration apparatus may perform a first clustering of the coordinates of line pixel(s) transformed into the coordinates in the world domain in operation 815 (operation 820). The calibration apparatus may perform a first clustering of pixels corresponding to a same lane into a same group.

The calibration apparatus may perform latitudinal correction (x-coordinate correction) of each line, such that the first clustered lines are parallel to each other and the latitudinal distance between the clustered lanes are equal to each other (operation 825).

The calibration apparatus may perform a second clustering of each of the line pixels corrected in the latitudinal direction in operation 830. The calibration apparatus may perform a second clustering of each of the line pixels corrected in the latitudinal direction according to partial lines. The calibration apparatus may longitudinally correct (y-coordinate correction) second-clustered partial lines based on, for example, the length of the partial lines and/or the interval between the lines (operation 835).

The calibration apparatus may scale lines (partial lines) that are finally calibrated through the operations described above (operation 840). The calibration apparatus may adjust the height ratio (or size ratio) between the image domain and the world domain through the scaling.

The calibration apparatus may match the coordinates(s) of the lines in the world domain scaled in operation 840 with the coordinates(s) in the image domain corresponding to the coordinates in the world domain into pairs (operation 845), respectively. The calibration apparatus may update calibration parameters based on the pairs of the coordinates matched in operation 845 (operation 850). The calibration apparatus may also update the initial calibration matrix by applying the updated calibration parameters to the initial calibration matrix, which is pre-set in operation 810.

Figure 9:
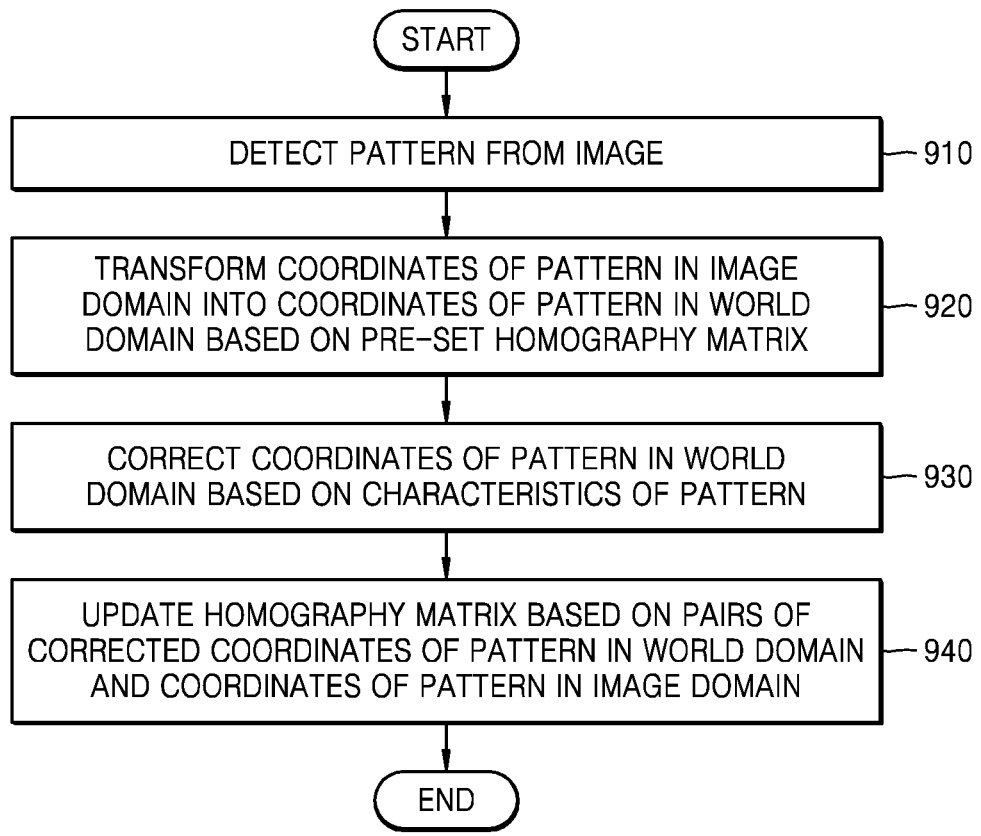
FIG. 9 is a flowchart of a calibration method according to an embodiment.
Figure 10:
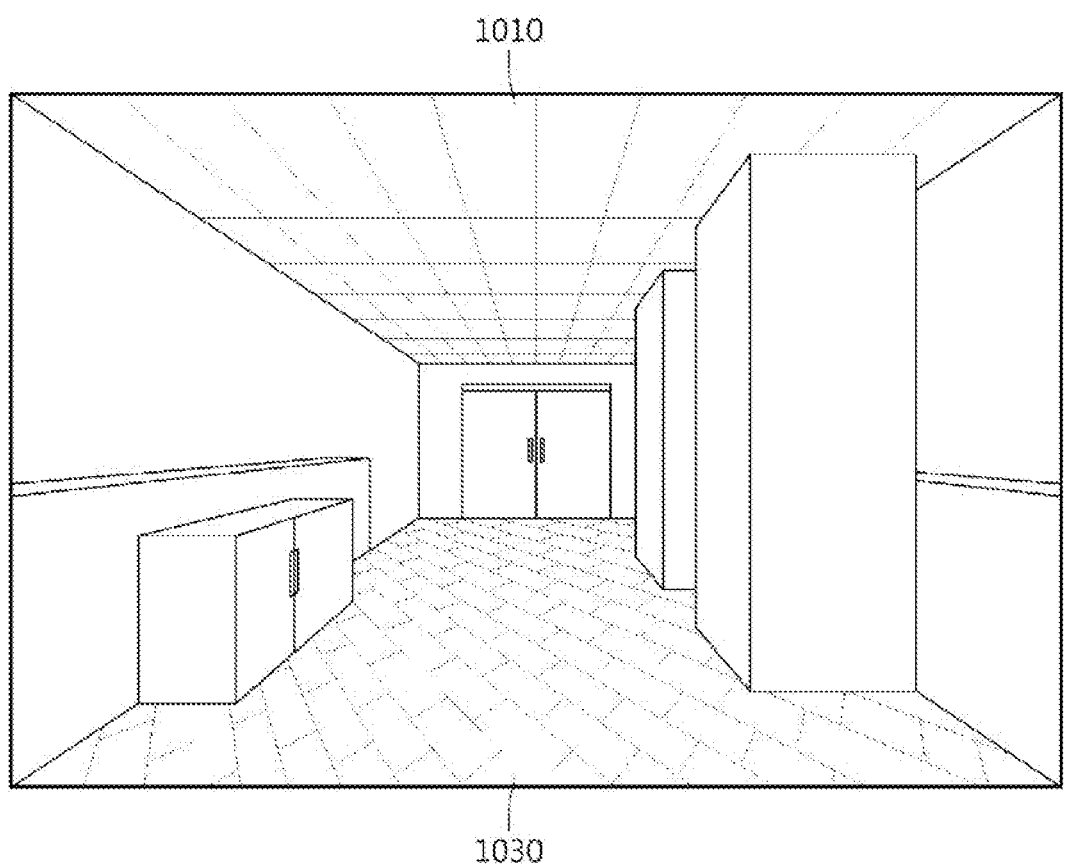
FIG. 10 is a diagram showing a pattern detected from an image according to an embodiment.

FIG. 9 is a flowchart of a calibration method according to another embodiment. FIG. 10 is a diagram showing a pattern detected from an image according to an embodiment.

Referring to FIGS. 9 and 10, a calibration apparatus according to an embodiment detects a pattern from an image (operation 910). For example, when a plurality of patterns 1010 and 1030 (having one or more repeating characteristics or shapes) are included in one image as shown in FIG. 10, the calibration apparatus may detect any one of the patterns or both the patterns.

The calibration apparatus transforms the coordinates of the patterns in the image domain into the coordinates of the patterns in the world domain based on a pre-set homography matrix (operation 920).

The calibration apparatus corrects the coordinates of the patterns in the world domain based on the characteristics of the patterns (operation 930). At this time, pattern characteristics may include various characteristics, e.g., the size of a pattern, the symmetry of the pattern, the shape of the pattern, the parallelism between shapes constituting the pattern, the lengths of the shapes, intervals between the shapes, the widths of the shapes.

In operation 930, the calibration apparatus may correct the x-coordinates of the pattern in the world domain based on at least one of, for example, the parallel characteristic between the shapes constituting the patterns and the distances between the shapes constituting the patterns. The calibration apparatus may cluster the coordinates of the patterns in the world domain according to shapes constituting the patterns. The calibration apparatus may correct the x-coordinates of the patterns in the world domain, such that the clustered shapes are parallel to each other and the distances between the clustered shapes are equal to each other.

Furthermore, in operation 930, the calibration apparatus may correct the y-coordinates of the pattern in the world domain based on at least one of, for example, the lengths of the shapes constituting the patterns and the intervals between the shapes constituting the patterns. The calibration apparatus may correct the y-coordinates of the patterns in the world domain, such that the clustered shapes are identical to each other and the intervals between the clustered shapes are equal to each other.

The calibration apparatus updates the homography matrix based on pairs of the coordinates of the patterns in the world domain corrected in operation 930 and the coordinates of the patterns in the image domain (operation 940).

FIG. 10 shows patterns 1010 and 1030 detected from an image. The pattern 1010 corresponds to a pattern detected at a room ceiling in the upper portion of the image, and the pattern 1030 corresponds to the pattern detected at a room floor in the lower portion of the image. The calibration apparatus according to an embodiment may perform a calibration by using the size of a pattern detected from an image, the symmetry of the pattern, and the shape of the pattern. In addition to the characteristics of the pattern, the calibration apparatus may perform a calibration by taking into account parallel characteristics between the shapes constituting the pattern, the lengths of the shapes, the intervals between the shapes, and the latitudinal distance between the shapes.

According embodiments, the calibration apparatus may perform a calibration by using the pattern 1010 for the upper portion of the image and may perform a calibration by using the pattern 1030 for the lower portion of the image.

The calibration apparatus according to an embodiment may facilitate a calibration for line detection and for purposes in various fields including a mobile cleaning robot or an autonomous factory, by updating calibration parameters by using patterns (e.g., a line pattern, a crosswalk pattern, a floor pattern, or a ceiling pattern) that are simply recognized from an image even without information like map information or line specifications according to road specifications as landmarks.

Figure 11:
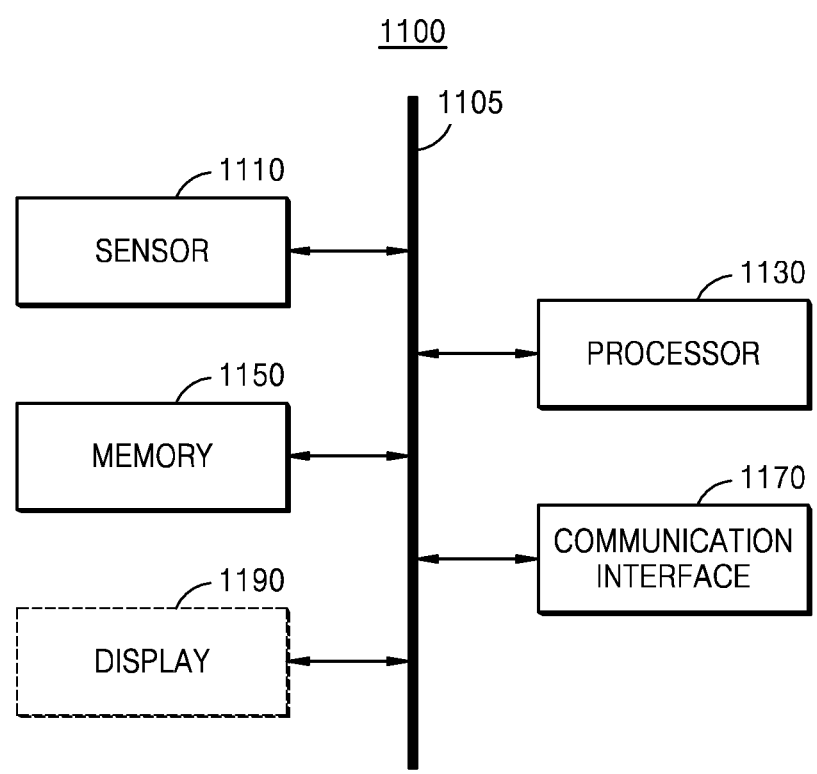
FIG. 11 is a block diagram of a calibration apparatus according to an embodiment.

FIG. 11 is a block diagram of a calibration apparatus according to an embodiment. Referring to FIG. 11, a calibration apparatus 1100 according to an embodiment includes a sensor(s) 1110, a processor 1130, and a communication interface 1170. The calibration apparatus 1100 may further include a memory 1150 and a display 1190. The sensor(s) 1110, the processor 1130, the memory 1150, the communication interface 1170, and the display 1190 may communicate with one another via at least one communication bus 1105.

The sensor(s) 1110 may include, for example, a camera sensor, an image sensor, and a vision sensor. The camera, the image sensor, and/or the vision sensor may be mounted on a vehicle to capture a driving image of the vehicle.

The processor 1130 may execute computer-readable instructions from memory corresponding to algorithms of at least one of the methods described above with reference to FIGS. 1 to 10. The processor 1130 may execute a program from memory and control the calibration apparatus 1100. Program code executed by the processor 1130 may be stored in the memory 1150.

The processor 1130 may include, for example, a central processing unit (CPU) or a graphics processing unit (GPU).

The memory 1150 may store a driving image and pairs of corrected coordinates in the world domain and coordinates in the image domain. The memory 1150 may also store a homography matrix updated by the processor 1130 and/or results of calibrations based on the updated homography matrix. The memory 1150 may include a volatile memory or a non-volatile memory.

The communication interface 1170 may receive a driving image captured outside the calibration apparatus 1100 or information from various sensors outside the calibration apparatus 1100, map information, etc. According to an embodiment, the communication interface 1170 may transmit a homography matrix updated by the processor 1130 and/or a result of a calibration performed based on the updated homography matrix to the outside of the calibration apparatus 1100 or to the display 1190.

The display 1190 may display the position of an object modified through the calibration performed based on the updated homography matrix together with or separately from the driving image. The display 1190 may display the coordinates of an object in the world domain updated through a calibration, for example, in the form of the position of the object in map information or a navigation image or in the form of updated coordinates of the objects in the world domain. For example, when the calibration apparatus 1100 is embedded in a vehicle, the display 1190 may be configured as a head-up display (HUD) installed in the vehicle.

The embodiments described above may be implemented with hardware components, software components, and/or a combination of hardware components and software components. For example, the devices, methods, and components described in the embodiments may be implemented within a processor, a controller, an arithmetic logic unit (ALU), a digital signal processor, a microcomputer, a field programmable gate array such as an array, a programmable logic unit (PLU), a microprocessor, or any other device capable of executing and responding to instructions. A processing device may execute an operating system (OS) and one or more software applications travelling on the OS. In addition, the processing device may access, store, manipulate, process, and generate data in response to execution of the software. For ease of understanding, the processing device may be described as being used singly, but one of ordinary skill in the art will understand that the processing device may include a plurality of processing elements and/or a plurality of types of processing elements. For example, the processing device may include a plurality of processors or one processor and one controller. Other processing configurations, such as a parallel processor, are also possible.

The software may include a computer program, code, instructions, or a combination of one or more of the foregoing, to configure the processing device to operate as demanded or to command the processing device independently or collectively. Software and/or data may be permanently or temporarily embodied on any type of machine, component, physical device, virtual equipment, computer storage media or device, or transmitted signal wave to be interpreted by the processing device or to provide commands or data to the processing device. The software may be distributed over a networked computer system and stored or executed in a distributed manner. The software and data may be stored on one or more computer-readable recording media.

The methods according to embodiments may be implemented in the form of program commands that may be executed through various computer means and recorded in a computer-readable recording medium. The computer-readable recording medium may include program commands, data files, data structures, and the like, alone or in combination. The program commands recorded on the medium may be specially designed and configured for embodiments or may be published and available to one of ordinary skill in computer software. Examples of the computer-readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, ROM, RAM, a flash memory, and the like. Examples of program commands include machine language code such as code generated by a compiler, as well as high-level language code that may be executed by a computer using an interpreter or the like. The hardware devices described above may be configured to operate as one or more software modules to perform the operations of the embodiments, and vice versa.

While the disclosure has been particularly shown and described with reference to embodiments thereof, it is to be understood that the disclosure is not limited to the embodiments. For example, it should be understood that appropriate results may be obtained even when the techniques described may be performed in a different order than the described methods, and/or that components of the described systems, structures, devices, circuits, etc. may be replaced by other components or equivalent components. Therefore, other implementations, other embodiments, and equivalents to the claims are within the scope of the following claims.

What is claimed is:

1. A calibration method for steering assist or autonomous driving of a vehicle, the calibration method comprising:
   detecting lines in an image of a road captured by the vehicle traveling on the road;
   transforming coordinates of the lines in the image of the road from an image domain into coordinates of the lines in a world domain in which the vehicle travels based on a homography matrix that represents a transformation relationship between the image domain and the world domain;
   correcting the coordinates of the lines in the world domain based on pattern characteristics of at least one of the lines;
   updating the homography matrix based on the corrected coordinates of the lines in the world domain and the coordinates of the lines in the image domain; and
   providing an output result of the updating for controlling the vehicle traveling on the road based on the lines.

2. The calibration method of claim 1, wherein the pattern characteristics of the at least one of the lines comprise at least one of parallel characteristics between the lines, lengths of the lines, a latitudinal distance between the lines, and an interval between the lines.

3. The calibration method of claim 2, wherein the correcting of the coordinates in the world domain comprises:
   correcting x-coordinates of the lines in the world domain based on at least one of the parallel characteristics between the lines and the latitudinal distance between the lines; and
   correcting y-coordinates of the lines in the world domain based on at least one of the lengths of the lines and the interval between the lines.

4. The calibration method of claim 3, wherein the correcting of the x-coordinates in the world domain comprises:
   clustering the coordinates in the world domain according to the lines; and
   correcting the x-coordinates in the world domain, such that the lines of which the coordinates are clustered are parallel to each other and the latitudinal distances between the lines are equal to each other.

5. The calibration method of claim 4, wherein the correcting of the y-coordinates in the world domain comprises:
   clustering the clustered lines according to partial lines; and
   correcting the y-coordinates in the world domain, such that lengths of the clustered partial lines are equal to each other and intervals between the clustered partial lines are equal to each other.

6. The calibration method of claim 1, wherein the correcting of the coordinates in the world domain comprises:
   selecting at least one reference line from among the lines based on a position of the vehicle;
   measuring reference pattern characteristics of the at least one selected reference line; and
   correcting coordinates of the lines in the world domain other than the at least one selected reference line based on the reference pattern characteristics of the at least one selected reference line.

7. The calibration method of claim 6, wherein the reference pattern characteristics comprise at least one of a characteristic that the at least one reference line and the lines in the world domain other than the at least one selected reference line are parallel to each other, a length of the at least one reference line, a distance between the at least one reference line and the lines in the world domain other than the at least one selected reference line adjacent to the at least one reference line in a latitudinal direction, and an interval between partial lines in the at least one reference line.

8. The calibration method of claim 6, further comprising updating the reference pattern characteristics based on at least one of line characteristics of a driving road according to a high-resolution map and a line characteristic of the road according to road specifications of a jurisdiction of the road.

9. The calibration method of claim 1, further comprising:
   detecting a road marking other than the lines in the image of the road;
   transforming coordinates of the road marking in the image domain into coordinates of the road marking in the world domain based on the homography matrix;
   correcting the coordinates of the road marking in the world domain based on pattern characteristics of the road marking;
   updating the homography matrix based on the corrected coordinates of the road marking in the world domain and the coordinates of the road marking in the image domain; and
   providing an output result of the updating for controlling the vehicle traveling on the road based on the road markings.

10. The calibration method of claim 9, wherein the pattern characteristics of the road marking comprise at least one of a width of the road marking, a length of the road marking, a size of the road marking, a symmetry of the road marking, and a shape of the road marking.

11. The calibration method of claim 10, wherein the correcting of the coordinates of the road marking in the world domain comprises:
   correcting x-coordinates of the road marking in the world domain based on the length of the road marking; and
   correcting y-coordinates of the road marking in the world domain based on the width of the road marking.

12. The calibration method of claim 1, wherein the detecting comprises detecting pixels of the lines in the image of the road based on at least one of a pixel-based scene segmentation technique and an edge detection technique.

13. The calibration method of claim 1, wherein the image comprises at least one of a single frame and successive frames.

14. A non-transitory computer recording medium storing thereon a computer program for executing the calibration method of claim 1.

15. A calibration method for steering assist or autonomous driving of a vehicle, the calibration method comprising:
   detecting a pattern of lines in an image of a road captured by the vehicle traveling on the road;
   transforming coordinates of the pattern of the lines from an image domain into coordinates of the pattern of the lines in a world domain based on a homography matrix that represents a transformation relationship between the image domain and the world domain;
   correcting the coordinates of the pattern of the lines in the world domain based on characteristics of the pattern of the lines;

updating the homography matrix based on the corrected coordinates of the pattern of the lines in the world domain and the coordinates of the pattern of the lines in the image domain; and providing an output result of the updating for controlling the vehicle traveling on the road based on the pattern of the lines.

16. The calibration method of claim 15, wherein the characteristics of the pattern of the lines comprise at least one of a size of the pattern of the lines, a symmetry of the pattern of the lines, a shape of the pattern of the lines, a parallel characteristic between shapes constituting the pattern of the lines, lengths of the shapes, intervals between the shapes, and latitudinal distances between the shapes.

17. A calibration apparatus for steering assist or autonomous driving of a vehicle comprising:
a sensor configured to obtain an image of a road being traveled by the vehicle; and
a processor configured to detect lines in the image of the road, transform coordinates of the lines in the image of the road from an image domain into coordinates of the lines in a world domain in which the vehicle travels based on a homography matrix that represents a transformation relationship between the image domain and the world domain, correct the coordinates of the lines in the world domain based on pattern characteristics of at least one of the lines, update the homography matrix based on the corrected coordinates of the lines in the world domain and the coordinates of the lines in the image domain, and provide an output result of the updating for controlling the vehicle traveling on the road based on the lines.

18. The calibration apparatus of claim 17, wherein the pattern characteristics of the at least one of the lines comprise at least one of parallel characteristics between the lines, lengths of the lines, a latitudinal distance between the lines, and an interval between the lines.

19. The calibration apparatus of claim 18, wherein the processor corrects x-coordinates of the lines in the world domain based on at least one of the parallel characteristics between the lines and the latitudinal distance between the lines and corrects y-coordinates of the lines in the world domain based on at least one of the lengths of the lines and the intervals between the lines.

20. The calibration apparatus of claim 19, wherein the processor clusters the coordinates in the world domain according to the lines and corrects the x-coordinates in the world domain, such that the clustered lines are parallel to each other and the latitudinal distances between the clustered lines are equal to each other.

* * * * *